June 28, 1960  R. C. WEIDE  2,943,286
CONTROLLER
Filed April 1, 1957  4 Sheets-Sheet 3

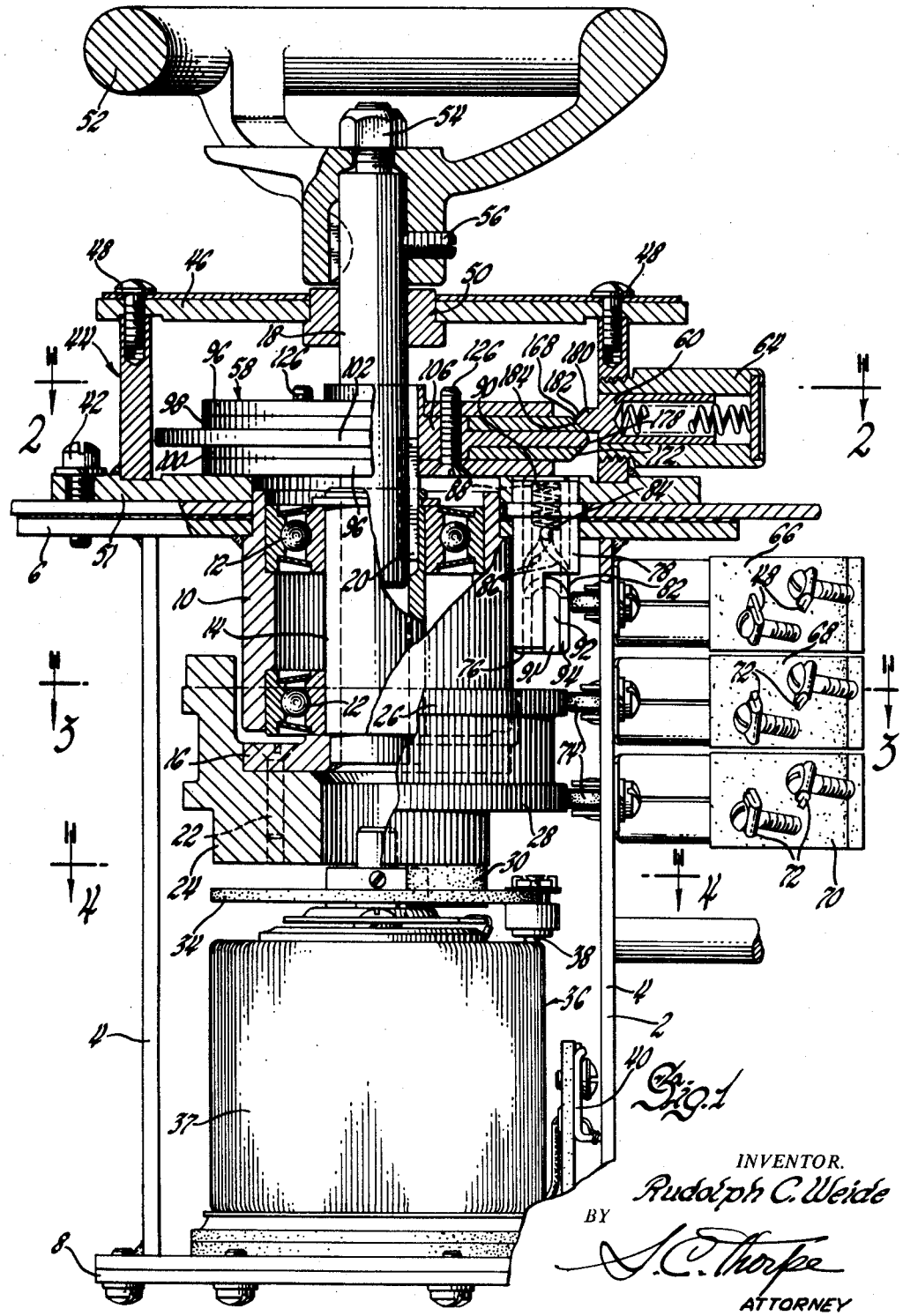

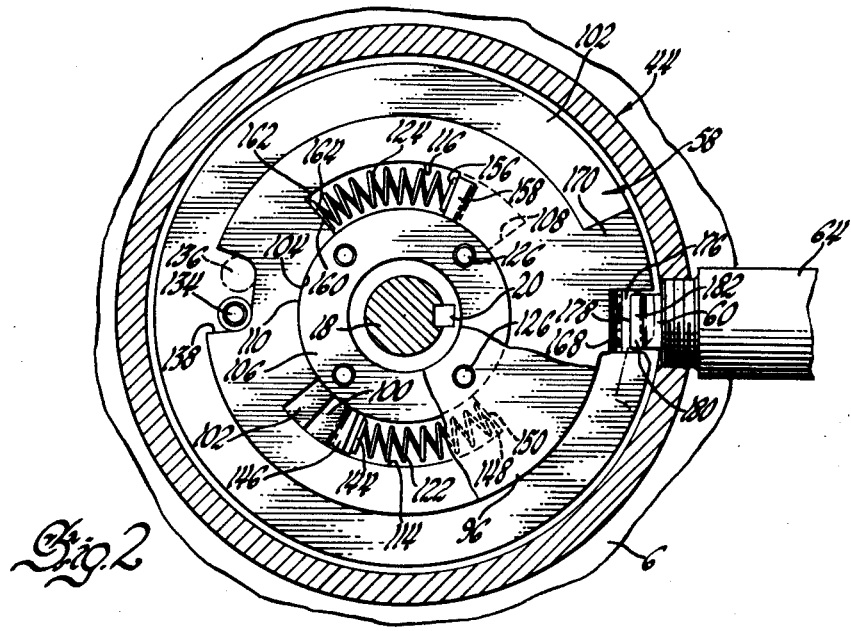

INVENTOR.
Rudolph C. Weide
BY
S. C. Thorpe
ATTORNEY

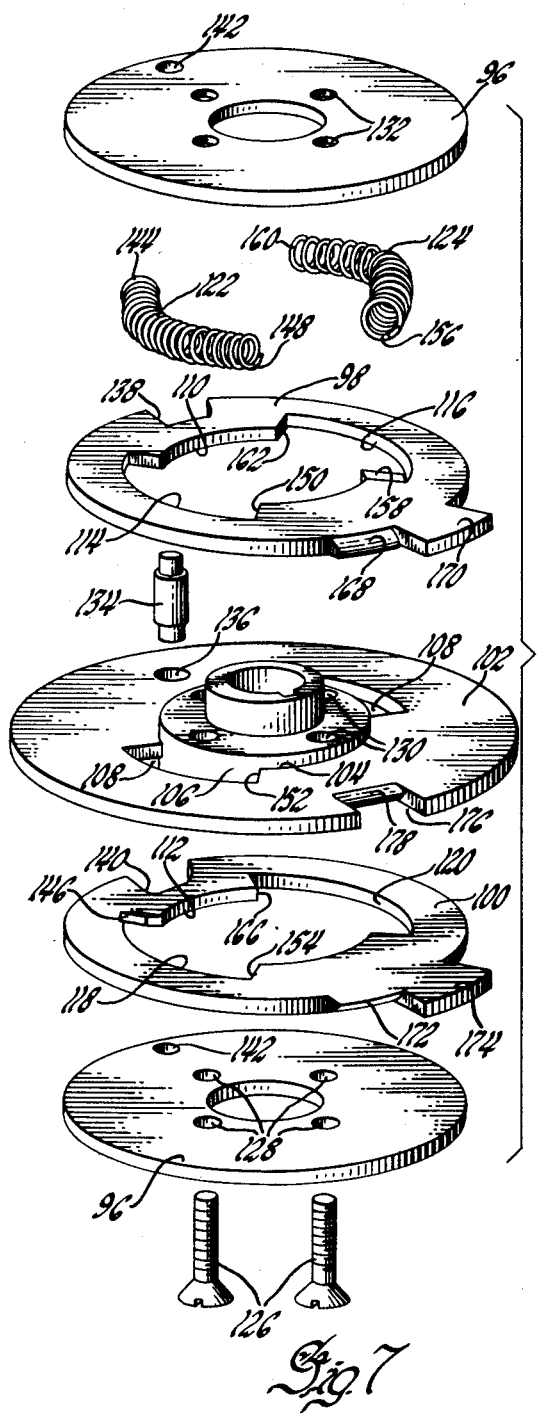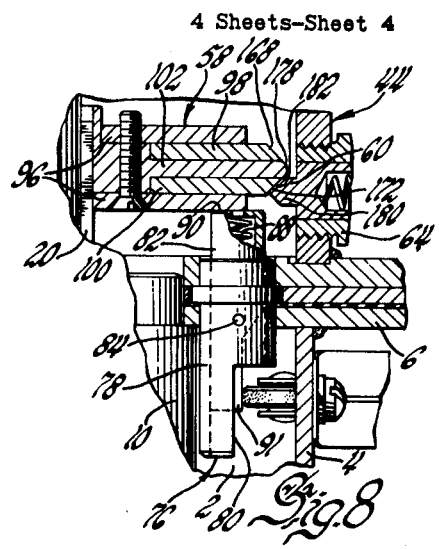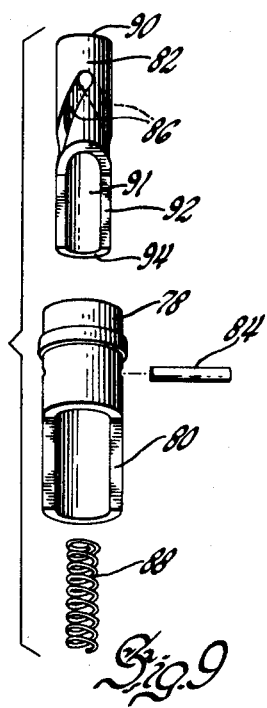

United States Patent Office 2,943,286
Patented June 28, 1960

2,943,286
CONTROLLER
Rudolph C. Weide, La Grange, Ill., assignor to General Motors Corporation, Detroit, Mich., a corporation of Delaware Filed Apr. 1, 1957, Ser. No. 649,850
4 Claims. (Cl. 338—67)

This invention relates generally to electro-mechanical controlling devices and particularly concerns devices of the aforementioned type which coordinate and interlock the various control functions so as to prevent injury and damage which might otherwise occur through inadvertent manual operation of the individual controls for determining the proper functions of the electrical equipment to which they may be connected.

The control device forming the subject of this invention, which can be applied in numerous ways, is particularly adapted for use with the prime mover driven generator-motor electric drives utilized where a wide variety of power selections and speeds are required. It is particularly useful for example in combination with the power equipment used in the oil drilling industry where in order to perform the various drilling operations a wide variation of both speed and power is needed. The controller as previously mentioned is of the electro-mechanical type, i.e., it is manually operated to mechanically control the selective actuation of electrical switching and rheostat operation.

It is an object of the present invention to provide a controller of the type heretofore mentioned whose novel construction enables an operator by means of a single manually operated handle or control to perform without fear of injury to other equipment controlled by such controller, all the power and speed functions required of the power equipment.

It is a more specific object of this invention to provide a controller utilizing a control shaft having both rotational and axial movement within a housing, which rotational movement is utilized to perform variations in power and speed of the equipment with which such controller may be used and which axial movement is used to select the direction of such power.

Another object of this invention is to provide a controller having a control shaft mounted for both rotational and axial movement within a housing whose axial movement is prevented in certain rotative positions to thereby interlock the power control functions with the directional functions.

For a fuller understanding of the invention and the advantages and other objects thereof, reference may be had to the accompanying detailed description and drawings, in which:

Fig. 1 is a view in elevation of the novel electro-mechanical controller with parts broken away and in section illustrating the various and unique features thereof.

Fig. 2 is a view taken substantially on the line 2—2 of Fig. 1 also with portions broken away illustrating in part the mechanism which is adapted to control a braking function of power equipment with which this controller may be combined.

Fig. 3 is a view taken substantially on the line 3—3 of Fig. 1 and serves to illustrate the cam actuation of certain of the switches mounted on the controller housing and which are controlled by certain of the operative portions of the controller.

Fig. 4 represents a fragmentary view taken substantially on the line 4—4 illustrating portions of a conventional rheostat and how balancing holes which are provided in the brush carrying plate of the rheostat are utilized to connect the control shaft of the controller to the brush carrying plate so as to be rotated thereby.

Fig. 7 is an exploded view of the sub-assembly of Fig. 6 illustrating the various parts thereof, and how they are to be assembled together.

Fig. 8 is a view of the portion of the switch actuating mechanism used to actuate the forward and reverse switch which is operated by axial movement of the control shaft of the controller.

Fig. 9 is an exploded view of certain of the elements of the switch actuating assembly of Fig. 8.

Figure 5:
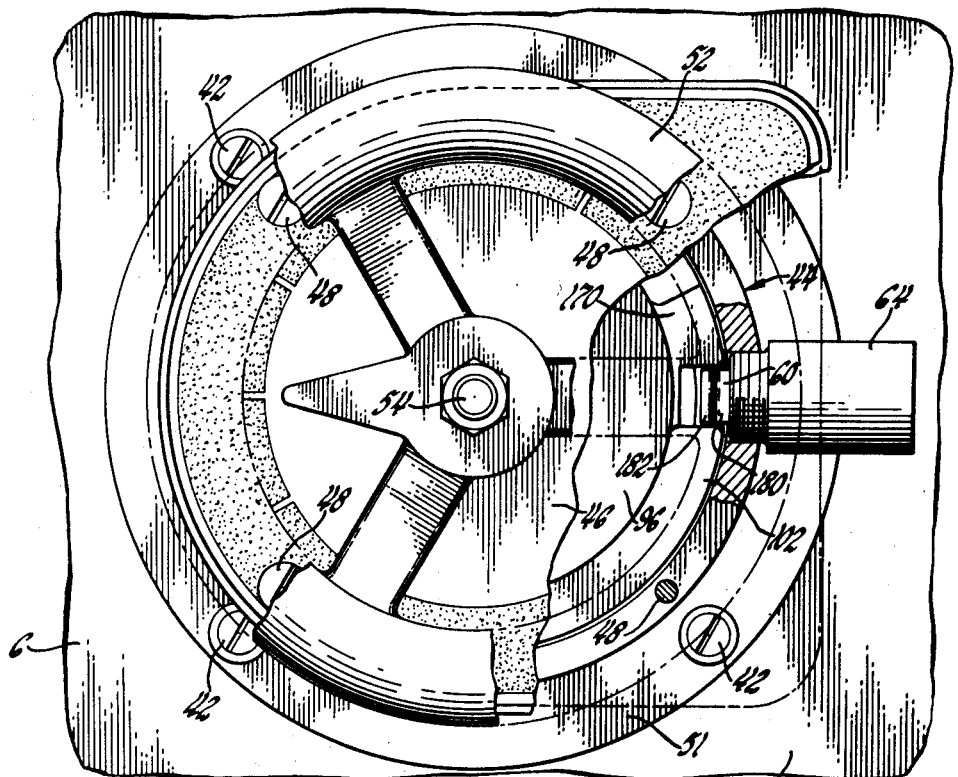
Fig. 5 is a top end view of the controller with portions broken away illustrating the manner of assembly of certain of the parts thereof and also its manually operated handle.

Before beginning the detailed description of this electro-mechanical controller, it is again emphasized that such a controller has numerous uses and that the application of such a controller for controlling the power components of an oil drilling rig although particularly adapted therefor is by way of example and illustration only.

In the accompanying figures and particularly Fig. 1, it will be observed that the controller comprises a supporting housing 2 including side plates 4 to which are suitably fixed a composite supporting plate assembly 6 and an end plate 8. Fixed to the plate assembly 6 is a bushing 10 having bearing cavities therein in which are mounted the ball bearing sets 12. Ball bearings 12 journal for rotation a hollow shaft extension 14 having welded or otherwise fixed to one end thereof a flange 16. Extending into the hollow portion of the hollow shaft extension 14 is a shaft 18 which together with shaft extension 14 forms the control shaft assembly of the controller. Shafts 18 and 14 are keyed together as indicated at 20 to rotate with each other but to allow axial movement relative to each other. The flange 16 which is fixed to the end of extension 14 has secured thereto by means of studs 22 a cam drum 24 provided with a pair of switch actuating cam surfaces 26 and 28. The lower end of the drum 24 as viewed in Fig. 1 has secured therein a pair of plugs 30 of suitable insulating material (see also Fig. 4) which extend into balancing holes 32 provided in the brush carrying plate 34 of a conventional alternating current variable rheostat assembly indicated generally by a numeral 36. This variable rheostat assembly 36 may be any of a number of well known types and in and of itself forms no part of the present invention and therefore no further description is deemed necessary with respect thereto other than to point out that it includes the usual winding 37 and brush 38 mounted on the rotatable brush carrying plate 34 and also the usual terminal post 40 for connecting it in electrical circuit with the electrical machinery of the power train to be controlled by the controller. It should, however, be further mentioned that movement of the brush 38 on the winding 37 of the rheostat 36 serves to vary the excitation of a generator which is driven by a prime mover. This variation in excitation in turn varies the output of the generator and the power available for performing the functions to which the power is connected. The rheostat 36 is mounted in housing 2 by being fastened to end plate 8.

Returning in particular to Fig. 1 of the drawings, the upper plate assembly 6 has secured thereto by means of studs 42 an adapter housing indicated generally by a numeral 44. The adapter housing 44 is generally cylindrical in form and is provided with a cover 46 fastened by the studs 48 to the cylindrical portion thereof. Cover 46 is provided with a bushing 50 which aids in journaling shaft 18 for both axial and rotational movement. Fixed to shaft 18 at the end opposite its key arrangement with hollow shaft 14 is a manual operating handle 52 which as indicated in Fig. 1 is keyed thereto and secured by the studded end 54 thereof and set screw 56. The adapter housing 44 encloses an interlocking mechanism indicated generally by numeral 58 attached to shaft 18 and whose construction and operation will be described with more particularity shortly. For the present, suffice it to say that the interlocking assembly 58 cooperates with a spring loaded cam detent 60 located in a detent housing 64 in turn having an end threaded into the cylindrical wall of the adapter housing 44.

Still referring primarily to Fig. 1, it will be noted that mounted on one of the side plates 4 in stacked relation are three electrical switches 66, 68 and 70, respectively. These switches are similar in construction and operation and are each provided with the usual terminals 72 and actuators which include in this case nylon roller followers 74. It will be observed that the follower 74 of switch 68 rides on cam surface 26 of cam drum 24. Switch 68 is a braking switch and from Fig. 3 it can be seen has only one braking position which is indicated by a recess 27 in the otherwise smooth cylindrical cam surface 26. Follower 74 of switch 70 (which is a power activating switch) rides on cam surface 28 of the drum 24, which surface 28 except for cut out 29 (see Fig. 3) to actuate switch 70 is also cylindrical. It will be noted, however, that the follower 74 of switch 66 (a directional switch) engages a switch operating plug assembly indicated generally by the numeral 76 and the details of which are best seen in Figs. 1, 8 and 9. This plug assembly 76 includes a plug housing 78 secured in the plate assembly 6 and having a slightly greater than semi-circular cut out 80 at one end thereof which extends into the housing 2 parallel to the axis of shaft 18. This notched or cut out portion 80 is located adjacent the follower 74 of switch 66. Located for axial movement in the plug housing 78 is a plug or plunger 82 which is secured for axial helical movement therein by means of a pin 84 extending diametrically opposite helical grooves 86 in plug 82 and which pin has its ends anchored in the cylindrical walls of the plug housing 78. Plug 82 is biased in a direction tending to move the plug 82 helically axially out of housing 2 by means of a helical coil spring 88 interposed between pin 84 and the closed end 90 of plug 82. It will be seen in the aforementioned Figs. 1, 8 and 9 that plug 82 is provided at the end 91 opposite the closed end 90 with a notched end or approximately semi-circular cut out 92 similar in both appearance and location and concentric with the cut out 80 of plug 78. The follower 74 of switch 66 engages the outer surface 94 or the notched portion 92 of plug end 91 depending on the rotational position of plug 82 in plug housing 78. The plug 82 is retained in the plug housing 78 in opposition to the effect of spring 88 tending to move it out of the housing and housing 2 by one of the plates of assembly 58, to be described in more detail shortly.

Figure 6:
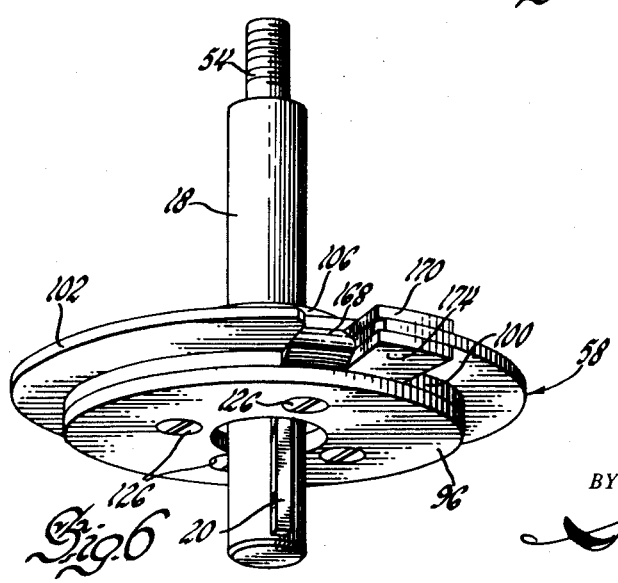
Fig. 6 is a perspective view of a sub-assembly of the controller incorporating the braking control mechanism and the interlocking features which prevent selection of forward and reverse operations during power operations.

Turning now particularly to Figs. 1, 6 and 7 of the drawings and also keeping in view Figs. 2 and 8, the interlocking mechanism 58 comprises five generally circular plates which include two outer plates 96 of the same diameter. A stop plate 98 is shown having a counterpart 100 whose main outer diameters are substantially the same as plates 96. A centrally located dividing plate whose main outer diameter is substantially greater than that of plates 96, 98 and 100, plate 102 is provided with a cylindrical cut out 104 in which is secured a cylindrical hub 106. The central portion of plate 102 is provided with diametrically opposite cut outs 108 which in combination with the outer cylindrical surface of hub 106 form opposite arcuate shaped pockets therein. The stop plates 98 and 100 are also provided with circular cut outs 110 and 112, respectively, which enables these plates 98 and 100 to be journaled for rotation on hub 106 on opposite sides of dividing plate 102. Stop plates 98 and 100 are also provided with diametrically opposed cut outs 114, 116, 118, 120 which are similar in size and configuration to cut outs 108 of dividing plate 102 and which when plates 98 and 100 are journaled on hub 106 in certain positions thereof align with the cut outs 108 and form pockets in which a pair of diametrically opposed springs 122 and 124 are arcuately positioned. The springs 122 and 124 are retained in the arcuate shaped grooves formed by the cut outs in plates 98, 100 and 102 and the plates 98 and 100 are retained for rotation on hub 106 by the outer plates 96 secured together and to the hub 106 by means of studs 126 which extend through countersunk holes 128 in the lower plates 96, holes 130 in hub 106, and threaded holes 132 in the upper plates 96, all as viewed in Fig. 7. To limit the rotational movement of stop plates 98 and 100 on hub 106 relative to dividing plate 102, a pin 134 is provided with an enlarged central shank portion extending through hole 136 in plate 102 which shank portion is alternately engageable by opposite sides of notches 138 and 140 provided in the outer peripheries of stop plates 98 and 100, respectively. The reduced ends of pin 134 are also anchored in holes 142 provided in the outer plates 96.

When the springs 122 and 124 are located in the pockets formed by the arcuate cut outs 108, 114, 116, 118, 120, an end 144 of spring 122 abuts a tab 146 provided on plate 100. The opposite end 148 of spring 122 abuts shoulders 150, 152 and 154 at the end of the arcuate pocket away from the tab 146. Similarly, an end 156 of spring 124 abuts a tab 158 at one end of the arcuate recess formed by cut outs 116, 118 and 120. The opposite end 160 of spring 124 abuts shoulders 162, 164 and 166 at the end of the arcuate pocket opposite tab 158. The entire set of plates 96, 98, 100, 102 when secured together appears as shown in Fig. 6 and the hub 106 is keyed to the shaft 18 by key 20 and fixed to move axially therewith in any suitable manner. It will be observed, particularly in Figs. 1, 2, 5, 6 and 7, that plate 98 is provided with, first, an inclined cam or ramp surface 168 extending radially slightly beyond the switch portion of its outer periphery. Immediately adjacent ramp or inclined cam surface 168 is a tap or ear forming an abutting stop 170. Stop plate 100 is provided with an inclined ramp or cam surface 172 similar but opposite to surface 168 of plate 98. Plate 100 also has thereon a tab or abutment 174. Plate 102 is notched as indicated at 176 and is provided with a wedge-like set of surfaces 178 adapted to fair smoothly on opposite sides thereof with the surfaces 168, 172, respectively, when these plates are positioned on opposite sides of plate 102.

Turning for a moment particularly to Figs. 1 and 8, it will be observed that the spring loaded cam detent 60 is provided with a wedge-like tip 180 made up of a pair of inclined intersecting surfaces 182, 184 so as to cause surfaces 182 and 184 to be generally parallel to surfaces 168, 178 and 172, respectively, so that tip 180 can slide up and over surfaces 168, 178 and 172 when the assembly 58 is moved axially by shaft 18 and handle 52.

The complete operation of the controller is as follows. Assuming that the handle 52 has been turned clockwise, as viewed in Fig. 5, so that tip 180 of spring detent 60 is in axial alignment with the notch 176 and surfaces 168, 178, and 172, the operator first selects whether he desires to operate in a forward direction or a reverse direction. This is accomplished by either pushing on handle 52 or pulling on the handle thereby causing tip 180 to ride through notch 178 so that it engages either surface 168 on plate 98 or surface 172 on plate 100, as the case may be. If the operator has pushed handle 52 axially inwardly so that tip 180 of spring detent 60 rides through notch 176 and onto surface 168 (the position in which assembly 58 is shown in Fig. 1), one of plates 96 which abuts the end 90 of plunger 82 will cause plunger 82 to move axially into housing 2. Plunger 82 by reason of helical grooves 86 will also turn causing the following roller of the actuator of switch 66 to ride out of the cut out or notched portion 92 onto surface 94. This is a smoothly accomplished transition by reason of the rolling feature of roller 74 and also the helical action of the plunger 82. Thus will the directional switch 66 be energized to set up any electrical connections for the proper directional movement and control of the driving equipment. Now, as the handle 52 is turned counterclockwise a few degrees, the follower 74 of switch 70 will ride up out of its recess 29 (see Fig. 3) onto the cylindrical cam surface 28. This will energize switch 70 and properly make power connections so that the rheostat 36 will be effective to control the power and speed of the driving equipment. If the handle 52 is turned further in a counterclockwise direction, the brush 38 of rheostat 36 will cause changes in the generator excitation of the generator-motor power set to increase the power and speed of the driving equipment. This power and speed will continue to increase until the handle 52 has been turned approximately between 270 and 360 degrees in a counterclockwise direction after which the abutment 170 on plate 98 will abut the tip 180 of detent 60 on the side thereof facing the viewer of Fig. 1. If now it is desired to slow down the speed and the power applied, the handle 52 is turned in a clockwise direction until it is returned to the position shown in Fig. 5. If, however, the inertia of the equipment causes it to continue to run or to coast, it may be necessary to brake the equipment and this may be accomplished merely by turning the handle 52 in a clockwise direction past the position shown in Figs. 2 and 5 in which case the opposite side of tab 170 engages the opposite side of tip 180 (see Fig. 2), causing plate 98 to rotate on hub 106 and compress spring 124 between tab 158 and shoulders 164, 166. Such movement is, of course, limited by pin 134 to a relatively small arc which, however, is sufficient to carry the follower 74 of switch 70 into recess 27 provided in the cam surface 26. This causes actuation of the switch 70 which energizes a suitable braking mechanism. The handle 52 will be returned by spring 124 to the position shown in Figs. 1, 2 and 5, from the braking position when released by the operator. It is important to note that the only position in which axial movement of the shaft 18 and the assembly 58 can occur is when the handle 52 is in the "off" position of Figs. 1, 2 and 5. In other words, once the direction of operation has been chosen by the operator and subsequently power or braking applied, the operator cannot inadvertently change the direction of power or brake application to possibly injure the electrical and mechanical driving and driven equipment, without first returning the handle 52 to the "off" position. This will be appreciated when it is realized that the tip 180 of spring detent 60 once it has been moved beyond the notched position 176 abuts either one side or the other of the plate 102, thus preventing any axial movement of the assembly 58 and shaft 18. Axial movement of assembly 58 is limited by bushing 50 and plate 51. If the "opposite" direction of operation is chosen, that is, with handle 52 and shaft 18 "out," power and speed and braking are applied with the same respective counterclockwise and clockwise rotations. In such instance stop plate 100 and its associated stop 170 become active in limiting rotation during power and braking.

It may now be appreciated that a unique electro-mechanical controller has been provided which is not only unusually simple in its operation considering its versatility but provides additionally for positive interlocking of forward and reverse operations so as to prevent inadvertent selection of either the forward or the reverse operation by the operator when power is being applied through the controller. It will be further appreciated that the controller is capable of a large number of applications and is not necessarily limited to the example set forth here.

What is claimed is:

1. A controller comprising a supporting housing, a rotatable control shaft mounted in said housing and having an Off position from which it may be rotated and to which it may be rotated, said shaft also being supported for axial movement in said housing between a pair of operating positions, and means to prevent axial movement of said shaft between said positions except when said shaft is in said Off position, said means including means yieldingly opposing axial movement of the shaft in either direction when in said Off position.

2. A controller comprising a housing, a shaft supported by said housing for rotatable and axial movement with respect thereto, said shaft having an Off position to and from which it is rotatable, said shaft having forward and reverse selector positions between which it is axially movable, and means to prevent axial movement of said shaft between said forward and reverse positions except when in said Off position, said means including spring biased cam means operative in said Off position to yieldingly oppose axial movement of the shaft from either of its forward and reverse selector positions.

3. An electro-mechanical controller comprising a supporting housing, a shaft assembly rotatably supported by said housing and including a pair of shaft members keyed to rotate together and telescoped for axial movement with respect to each other, a rheostat operatively connected to one of said members and an operating handle operatively connected to the other of said members, the rotatable movement of said shaft assembly and said rheostat by said handle constituting a first operational function of said controller, a selector mechanism secured to the other of said members for both rotational and axial movement therewith, selector switching means operable by axial movement of said selector mechanism with the other of said members, a radially inwardly extending projection mounted on said housing, said mechanism including a radially extending plate having a notch therein which when axially aligned with said projection defines an inoperative position of said first operational function allowing axial movement of the other of said members and said plate in said inoperative position only.

4. An electro-mechanical controller comprising a supporting housing, a shaft assembly supported on said housing having a rotary movement defining a range of power application, a pair of axially spaced stops on said housing, said shaft having axial movement between said stops defining the direction of said range of power application, and means preventing axial movement of said shaft assembly within said range of power application comprising a detent mounted on said housing extending normal toward said shaft, a locking plate mounted on said shaft for rotation therewith and having a notch aligning with the said detent when said shaft is in a rotary position without the range of said power application to allow limited axial movement of said shaft between said stops when without said range, said plate abutting said detent when axial movement of said shaft assembly is attempted within said range of power application.

References Cited in the file of this patent

UNITED STATES PATENTS

| | | |
|---|---|---|
| 1,245,264 | Peck | Nov. 6, 1917 |
| 1,300,665 | Smith | Apr. 15, 1919 |
| 1,816,813 | Angelides | Aug. 4, 1931 |
| 1,872,380 | Woods | Aug. 16, 1932 |
| 1,890,375 | Garrett | Dec. 6, 1932 |
| 2,268,550 | Little et al. | Jan. 6, 1942 |
| 2,442,984 | Paris | June 8, 1948 |